UNITED STATES PATENT OFFICE.

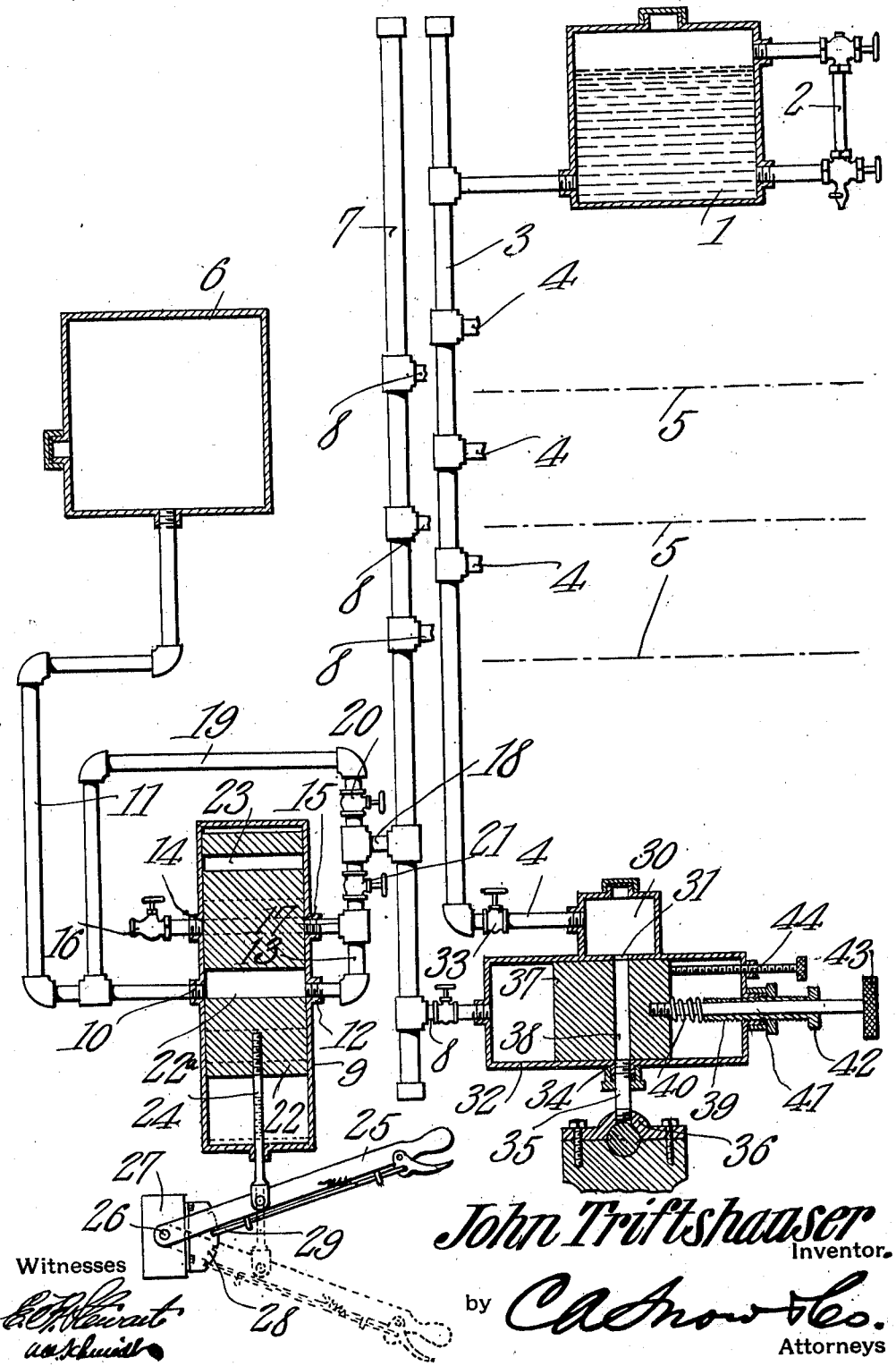

JOHN TRIFTSHAUSER, OF HORNELL, NEW YORK.

LUBRICATION APPARATUS.

982,906.  Specification of Letters Patent.  Patented Jan. 31, 1911.

Application filed March 22, 1910. Serial No. 550,883.

*To all whom it may concern:*

Be it known that I, JOHN TRIFTSHAUSER, a citizen of the United States, residing at Hornell, in the county of Steuben and State of New York, have invented a new and useful Lubrication Apparatus, of which the following is a specification.

This invention relates to apparatus for supplying a lubricant to bearings and other parts of machinery requiring lubrication, and it has for its object to provide an apparatus which is so arranged that any number of parts may be supplied, a reservoir being employed which is connected to the several parts. The flow of lubricant is controlled by a fluid-pressure operated valve located adjacent to each part, and said valves are controlled from one point, so that the lubricant may be turned on or off in the entire system from this point.

In order that the invention may be better understood, reference is had to the accompanying drawing, in which a diagrammatic view of the apparatus is shown, with parts in section.

In the drawing, 1 denotes a lubricant reservoir fitted with a glass gage 2 for indicating the level therein. This reservoir is located at such an elevation that the lubricant will flow to the several parts by gravity. To the reservoir is connected a main supply pipe 3 from which branch pipes 4 extend to the several parts to be lubricated.

The dotted lines 5 indicate the several floors of the building on which the machinery to be lubricated is located. At each floor, one or more branch pipes lead from the pipe 3 to the parts to be lubricated, and in each of said branch pipes is interposed a fluid-pressure operated valve to be hereinafter described.

At 6 is indicated a compressed air reservoir which supplies a pipe 7. Branch pipes 8 lead from the pipe 7 to the several floors, and are connected to the fluid pressure operated valves controlling the flow of the lubricant to the parts to be lubricated.

The casing of the valve which controls the flow of compressed air is indicated at 9, said casing being cylindrical, and having on one side a port 10 which is entered by a pipe 11 leading from the air reservoir 6. Diametrically opposite the port 10, is a port 12 to which is connected a pipe 13 leading to the pipe 7. The valve casing also has diametrically opposite ports 14 and 15. To the port 14 is connected a cock 16, and the port 15 is connected by a pipe 17 to the pipe 13. A branch pipe 18 connects the pipe 13 to the pipe 7, and from this branch pipe 18, a by-pass pipe 19 extends around the casing 9, and is connected to the pipe 11 at some point between the air reservoir 6 and the port 10. In the by-pass pipe is a valve 20, and in the pipe 13, between the port 12 and the branch pipe 18, is a valve 21.

In the casing 9 works a valve 22 having ports 22$^a$ and 23 respectively. In one position of the valve, the port 22$^a$ is in alinement with the ports 10 and 12, and thus establishes communication therebetween, and in another position of the valve, the body thereof comes between these two ports, and thus shuts off communication between the same, and in this position, the port 23 is in line with the ports 14 and 15, and establishes communication therebetween. To the valve is connected a rod 24 which passes out of the casing through one of the ends thereof, and has connected to its outer end a hand lever 25 fulcrumed at 26 on a suitably supported bracket 27. The bracket also carries a toothed segment 28 engageable by a spring latch 29 carried by the hand lever for locking the same.

Each pipe 4 is connected to a chamber 30 having a port 31 opening into a cylinder 32. In the pipe 4 is a valve 33 for shutting off the oil, or admitting the same into the chamber 30. Diametrically opposite the port 31, the cylinder 32 has a port 34 which is connected by a pipe 35 to the bearing 36 or other part to be lubricated. In the cylinder 32 operates a valve for establishing communication between the ports 31 and 34 so that the lubricant may flow from the chamber 30 to the part 36. This valve is a plunger 37, which, when in line with having a port 38, which, when in line with the ports 31 and 34, permits the lubricant to flow from the chamber 30 to the part 36, and when the valve body comes in line with these two ports, communication between the same is cut off, and the lubricant is shut off from the part 36.

To that end of the cylinder 32 opposite the end which is entered by the pipe 8, is secured a tube 39 which extends for a short distance into the chamber, and serves as an abutment for one end of a spring 40 coiled around a stem 41 secured to the valve, the other end of the spring abutting against the valve. This tube screws into a nipple on the end of the cylinder and is adjustable to vary the tension of the spring. The outer end of the tube is formed with a knurled head 42 to facilitate its adjustment. The stem 41 is slidably mounted in the tube, and projects from the outer end thereof, its projecting end being fitted with a knurled finger piece 43.

The valve 37 is moved forwardly in the cylinder 32 into position to place the port 38 in line with the ports 31 and 34, when air is turned into the cylinder. This movement of the valve compresses the spring 40, so that when the air is shut off, said spring upon expanding returns the valve to shut off the port 31 from the port 34. The stem 41 is provided for manually moving the valve to open position, if, for any reason, it becomes necessary to do so. That end of the cylinder which carries the sleeve 39, also carries a stop 44 for limiting the movement of the valve in this direction, said stop being a screw which is threaded through a nipple on the end of the cylinder, and extends thereinto. The travel of the valve to open position is regulated by adjusting the screw.

The drawing shows the position of the parts when the fluid-pressure operated valve is open, to permit the lubricant to flow to the part 36. The valve 22 establishes communication between the ports 10 and 12, and the air is therefore free to flow from the reservoir 6, through the pipe 11, and by the way of the valve 22 into the pipe 13, from which it flows through the branch pipe 18 into the pipe 7, and then by the way of the pipe 8 into the cylinder 32. The compressed air thus entering the cylinder, has moved the valve 37 forwardly, and placed the port 38 in line with the ports 31 and 34, thus placing the chamber 30 in communication with the pipe 35, and said pipe carrying the lubricant to the part 36. To shut off the flow of lubricant to the part 36, the valve working in the cylinder 9 is moved to a position in which the valve body shuts off communication between the ports 10 and 12, thus shutting off the flow of air to the cylinder 32. At the same time the port 23 comes in alinement with the ports 14 and 15, and thus opens the cylinder 32 to the exhaust, the air passing out of the same through the pipe 8, into the pipe 7, and then by the way of the pipes 18 and 13 into the pipe 17, and then through the port 23 to the cock 16. The pressure in the cylinder 32 being thus relieved, the spring 40 moves the valve 37 to closed position, and shuts off the port 31 from the port 34.

If the valve working in the cylinder 9 should get out of order, it will be possible to turn air into the cylinder 32 by the way of the by-pass 19, upon opening the valve 20. It will be understood that this valve is to remain closed at all other times.

What is claimed is:

In a lubrication apparatus, a lubricant reservoir, a cylinder connected to the part to be lubricated, a chamber having a port opening into the cylinder, said chamber being connected to the reservoir, a fluid-pressure operated valve in the cylinder, a fluid-pressure supply pipe entering the cylinder, a valve casing having two sets of diametrically opposite ports, one of the ports of each set being connected to the said supply pipe, and the other ports of the set being connected respectively to a source of fluid-pressure supply, and to an outlet, a valve working in the casing, and controlling the ports, said valve in one position establishing communication between one set of ports, and in another position closing said ports, and establishing communication between the other set, and means for operating the last mentioned valve.

In testimony that I claim the foregoing as my own, I have hereto affixed my signature in the presence of two witnesses.

JOHN TRIFTSHAUSER.

Witnesses:
HARRY L. ALLEN,
EDITH P. CANFIELD.